July 20, 1965    T. ANDERSON    3,195,963
STEPPED GAS BEARING
Filed Dec. 26, 1962
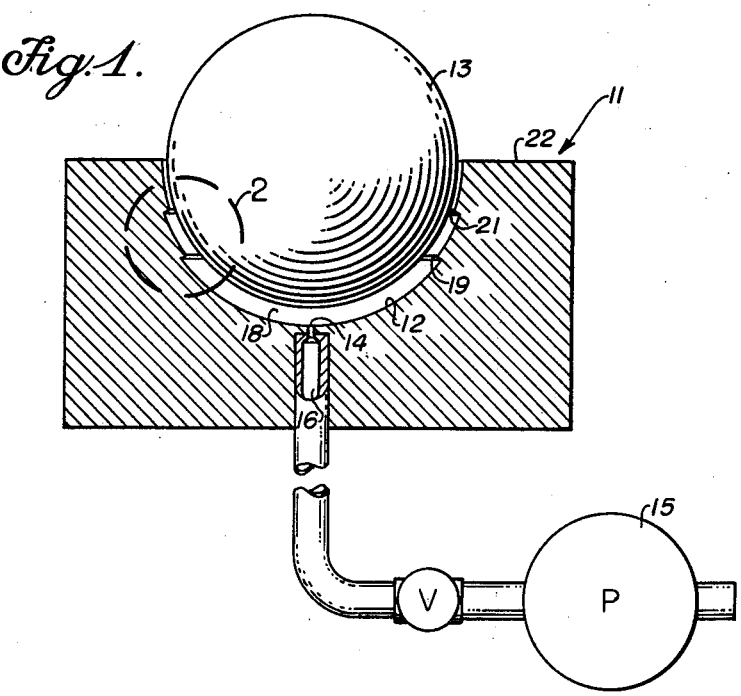
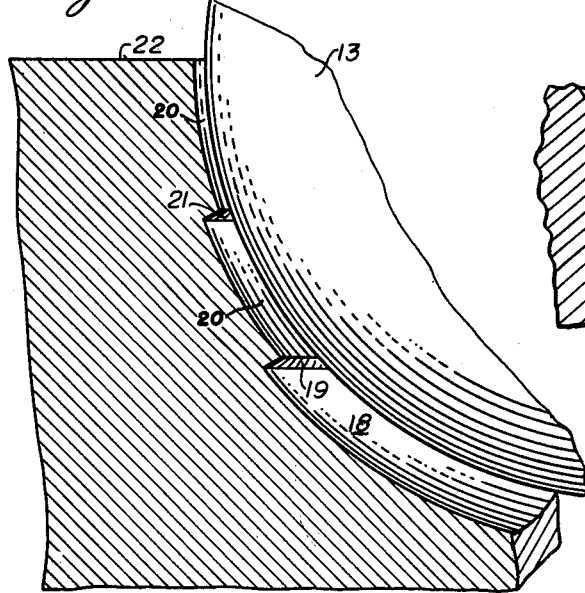
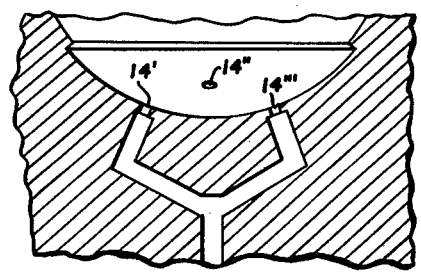
INVENTOR.
THURE ANDERSON
BY Roland A. Anderson
ATTORNEY _United States Patent Office_ 3,195,963
Patented July 20, 1965

3,195,963
STEPPED GAS BEARING
Thure Anderson, Castro Valley, Calif., assignor to the United States of America as represented by the United States Atomic Energy Commission
Filed Dec. 26, 1962, Ser. No. 247,417
5 Claims. (Cl. 308—9)

The present invention relates to bearings and, more particularly, to gas-lubricated, stepped bearings for the near frictionless static and dynamic support of various shaped objects. In general, the gas-lubricated bearing comprises a generally solid bearing seat having a recessed portion, said recessed portion defining a step at a common altitude on the periphery thereof.

Inherent to the previous use of gas as a bearing lubricant is the heretofore unsolved problem of the piston or pounding effect, i.e., a vertical vibration of the supported object upon the bearing seat. A closer examination of this problem will serve to illustrate the worth of the present invention.

When an object, such as a sphere for instance, is seated upon a bearing and pressurized gas is admitted at the nadir of the bearing seat, a series of events are set in motion. First, the incoming gas builds up pressure against the sphere until this pressure reaches a critical point and the sphere is lifted. Upon the lifting of the sphere, the gas rushes out of the bearing along the sides of the sphere in a laminar flow, thereby reducing the pressure below the aforementioned critical point. Co-incidental to this drop in pressure, the sphere falls back upon the bearing seat and remains thereon until the critical pressure is once again achieved. This process is cyclic, and the end result is that the sphere vibrates up and down on the bearing seat; the aforementioned undesirable piston effect.

The present invention overcomes this problem in a unique manner, i.e., by having one or more steps in the bearing seat. This, in turn, causes the laminar flow of the gas to be diverted from its previous path around the sphere such that a stable film of gas is maintained, thereby supporting said sphere.

While the dimensions of this step may vary, it is important that the general configuration be such that the step be so formed as to present an annular shoulder to the incoming lubricant gas flow. A preferred configuration of this step is defined by the abrupt decrease of the recessed portion of the bearing seat at a common altitude thereof.

In passing, it is to be noted that the above-mentioned "steps" should not be confused with "grooves" or "zones." The prior art has employed grooves and zones, for drainage purposes, for distribution of pressure, and other purposes, but not to divert the kinetic energy of the laminar flow of the lubricant. Further, a stable support of a sphere has not been achieved through the use of gas bearings before the use of the present invention, even though grooves were well known to the art.

It is, therefore, an important object of the present invention to provide a stepped gas bearing for the stable static support of various objects.

A further object of the invention is to provide a stepped gas bearing for the near frictionless, dynamic support of a sphere.

Other objects and advantages of the present invention will be more readily ascertained from an inspection of the following specification taken in conjunction with the accompanying drawing, wherein like numerals refer to like parts throughout, while the features of novelty will be more distinctly pointed out in the appended claims.

In the accompanying drawing:

FIGURE 1 is a cross-sectional view of a preferred embodiment of the present invention.

FIGURE 2 is an exploded view of the "stepped" portion of the preferred embodiment shown in FIGURE 1.

FIGURE 3 is a cross-sectional view of another preferred embodiment of the present invention.

In FIGURE 1 there is shown a bearing 11 comprising a stepped bearing seat 12 wherein is placed an object, such as sphere 13. Gas is admitted through orifice 14 from a valved, pressurized gas supply 15. Although gas supply 15 is shown in the drawing as a pump, it is to be understood that various supplies such as tanks of pressurized gas may be used within the scope of the present invention.

Some of the parameters in the admission of the lubricating gas are critical, while others are not. To differentiate one from the other, the gas is shown in FIGURE 1 to be admitted through a passage 16 lying on the axis of symmetry common to both sphere 13 and bearing seat 12, then through constricted orifice 14, to the nadir of seat 12. The route of passage 16 is not critical; indeed, several passages as shown in FIGURE 3 may be employed to admit the gas so long as their outlets 14′, 14″ and 14‴ in combination are symmetric to said common axis of symmetry and penetrate seat 12 below the first step. The constriction in orifice 14 is quite critical because this constriction prevents the transmission of any possible resonance within the source 14 or passage 16 to the concave shaped recessed portion 18.

After admission, the gas laminarly flows up the interior walls of bearing seat 12 until the flow is partially diverted by steps 19 and 21. These steps are the main point of novelty of the present invention and are described in further detail, infra. It is to be understood, however, that two steps are used to illustrate a preferred embodiment of the present invention, but they may range in number from one to many.

The gas then continues its flow until it exhausts into the atmosphere at the portion of upper face 22 of seat 12 which circumscribes concave portion 18. The end result of this gas flow is a near frictionless support of sphere 13 upon a thin film of gas.

With reference to FIGURE 2, the stepped portions 19 and 21 are shown in greater detail. This greater detail permits a showing of an upwardly diverging face 20 on each of steps 19 and 21. It is seen that the steps are formed by the contiguous proximity of different radii; that is, the radius of concave portion 18 is greatest at the nadir and smallest at the upper surface. This difference in radius may be small, on the order of thousandths of an inch, but it is extremely important. It is these steps that make possible the aforementioned stabilization. More specifically, while the theoretical explanation of the stepped gas bearing has not yet been fully resolved, it is known that the static loading provided by the pressurized gas supply supports the sphere, while the step dampens the instability inherent to such pneumatic devices to provide a highly stable bearing.

While the present invention is shown and described by means of an embodiment that supports spheres, it is within the scope of the present invention to support various other circular cross section objects such as cones, cylinders, etc. This is accomplished by forming the stepped, recessed portion so as to mate with the object to be supported. Therefore, while the present invention has been described in detail with respect to one embodiment thereof, it will be apparent that numerous modifications may be made within the spirit and scope of the invention. Accordingly it is not desired to limit the invention to the exact details shown, except insofar as they are defined in the subjoined claims.

What is claimed is:
1. In a gas-lubricated stepped spherical bearing, the combination comprising:
(a) a generally solid bearing seat defining an upper surface and having a spheroidal concave portion formed into said upper surface, (b) means defining a plurality of steps, each of said steps separately formed at a common altitude on the periphery of said concave portion by the abrupt transition of one concentric radius of curvature to another, said transitions being from larger to smaller radii when following said periphery from the nadir toward the upper surface providing an abrupt lower face thereon defining a lower recess in said concave portion, each of said steps including a concave upwardly diverging face, and (c) means for the pressurized introduction of a gas, including at least one constricted orifice positioned proximate the nadir of said concave portion.

2. A gas-lubricated, stepped, spherical bearing according to claim 1 in which said means for the pressurized introduction of gas comprises a plurality of orifices so positioned as to penetrate the bearing seat below the steps in radial symmetric relation about the axis of said seat.

3. A gas lubricated bearing seat for supporting a circular cross section body therein comprising, (a) a solid body having a generally planar upper surface and a generally hemispherical recess in said planar surface and a circular cross section body positioned therein, said solid body having a concave lower portion encompassing the nadir region of said recess and having a greater radius of curvature in said nadir region as compared to upper portions thereof, the circumferential wall portion of said recess adjacent said planar surface being closely parallel to the configuration of adjacent surfaces of said supported circular cross section body, (b) a plurality of substantially horizontally positioned circumferential steps integral with and normal to said adjacent hemispherical recessed surface defining said recess and having lower faces projecting generally inward therein with respect thereto and with the lowermost thereof defining the upper limit of said lower concave body portion of said recess, said steps including an upwardly diverging face portion uppermost thereof terminating in said upper circumferential wall portion, (c) and conduit means for introducing a pressurized gas into said recess including at least one orifice disposed symmetrically with respect to said nadir in the lower concave portion of said recess, said orifice being constricted immediately adjacent said point of introduction into said recess.

4. In a bearing assembly including a gas lubricated bearing seat and a spherical body supported therein, the combination comprising, (a) a spherical body, (b) a solid body having a generally planar upper surface and a generally hemispherical recess in said planar surface and encompassing lower portions of said spherical body, said solid body having a lower concave surface portion in the nadir region of said recess having a greater radius of curvature thereat as compared to the upper portions thereof, the uppermost surface portion of said recess being spherically concave and adjacent and terminating in said planar surface, said uppermost surface being substantially concentric with the surface of said spherical body, (c) at least a first and last substantially horizontally positioned circumferential steps integral with the surface of said recess and having a lower face projecting abruptly into said recess with respect to said lower concave surface portion to approach said spherical body and an upper face diverging concavely toward the upper portion of said recess, the lower face of said first step terminating at said lower concave wall portion and the upper face of said last step terminating at the uppermost circumferential recess surface, (d) and conduit means for introducing a pressurized gas into lower portions of said recess including a constricted orifice opening at the nadir of said lower concave body portion.

5. A bearing assembly as defined in claim 4 wherein said conduit means includes a plurality of constricted orifice openings disposed symmetrically with respect to said nadir.

References Cited by the Examiner

UNITED STATES PATENTS 2,898,764  8/59  Kinsey et al.
2,937,294  5/60  Macks.

FOREIGN PATENTS 215,570  6/58  Australia.

OTHER REFERENCES

Page 47, 1/60, Product Engineering.
Pages 46–49, 11/60, Product Engineering.

ROBERT C. RIORDON, *Primary Examiner.*
FRANK SUSKO, *Examiner.*